(12) United States Patent
Itozawa et al.

(10) Patent No.: US 11,987,446 B2
(45) Date of Patent: May 21, 2024

(54) OPENING-CLOSING CONTROL DEVICE, OPENING-CLOSING CONTROL SYSTEM, TASK SYSTEM, OPENING-CLOSING CONTROL METHOD, AND COMPUTER-READABLE MEDIUM

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 17/515,965

(22) Filed: Nov. 1, 2021

(65) Prior Publication Data
US 2022/0234828 A1 Jul. 28, 2022

(30) Foreign Application Priority Data
Jan. 28, 2021 (JP) .................. 2021-011916

(51) Int. Cl.
*B65G 1/137* (2006.01)
*B65G 47/90* (2006.01)

(52) U.S. Cl.
CPC ........... *B65G 1/137* (2013.01); *B65G 47/905* (2013.01); *B65G 2203/0283* (2013.01)

(58) Field of Classification Search
CPC .................. B65G 1/137; B65G 47/905; B65G 2203/0283; B65G 2203/0266
See application file for complete search history.

(56) References Cited

U.S. PATENT DOCUMENTS

| 11,790,715 B2* | 10/2023 | Dautz ............... G06Q 10/0832 |
| | | 235/382 |
| 2005/0060938 A1* | 3/2005 | Fitzgerald ............... G07F 11/62 |
| | | 49/125 |

(Continued)

FOREIGN PATENT DOCUMENTS

| CN | 111874502 A | 11/2020 |
| CN | 111899421 A | 11/2020 |

(Continued)

*Primary Examiner* — Joseph M Rocca
*Assistant Examiner* — Benjamin J Brosh
(74) *Attorney, Agent, or Firm* — Dickinson Wright, PLLC

(57) ABSTRACT

An opening-closing control device according to an embodiment of the present disclosure is a device that controls opening and closing of a plurality of doors of an accommodating portion when a robot executes a task of loading or unloading an object to and from the accommodating portion. The opening-closing control device includes a door opening information acquisition unit that acquires information indicating a door to be opened in order to execute the task; and a control unit that controls, based the on the information indicating the door to be opened in order to execute the task, a lock unit that is arranged corresponding to each of the plurality of doors and that is configured to restrict a door other than the door to be opened in order to execute the task in a closed state.

11 Claims, 16 Drawing Sheets

(56) References Cited

U.S. PATENT DOCUMENTS

| | | | | |
|---|---|---|---|---|
| 2015/0321595 A1* | 11/2015 | Hempsch | ............ | G06Q 10/083 |
| | | | | 414/812 |
| 2017/0121021 A1* | 5/2017 | Bonazzoli | ................ | B64D 1/08 |
| 2018/0244469 A1 | 8/2018 | Testa et al. | | |
| 2019/0310655 A1* | 10/2019 | Voorhies | ................ | G06Q 50/28 |
| 2021/0150655 A1* | 5/2021 | Matsutani | ............. | G06Q 50/28 |

FOREIGN PATENT DOCUMENTS

| | | | |
|---|---|---|---|
| JP | 2004303835 A | 10/2004 | |
| JP | 2020161113 A | 10/2020 | |

\* cited by examiner

OPENING-CLOSING CONTROL DEVICE, OPENING-CLOSING CONTROL SYSTEM, TASK SYSTEM, OPENING-CLOSING CONTROL METHOD, AND COMPUTER-READABLE MEDIUM

CROSS-REFERENCE TO RELATED APPLICATION

This application claims priority to Japanese Patent Application No. 2021-011916 filed on Jan. 28, 2021, incorporated herein by reference in its entirety.

BACKGROUND

1. Technical Field

The present disclosure relates to an opening-closing control device, an opening-closing control system, a task system, an opening-closing control method, and a computer-readable medium, and for example, relates to an opening-closing control device, an opening-closing control system, a task system, an opening-closing control method, and a computer-readable medium of a plurality of doors of an accommodating portion when a robot executes a task of loading or unloading an object to or from the accommodating portion.

2. Description of Related Art

As disclosed in FIG. 1 of Japanese Unexamined Patent Application Publication No. 2004-303835 (JP 2004-303835 A), a shelf for accommodating an object such as a package is provided with a door that can be opened and closed. Thus, the door is opened when loading an object into the shelf or unloading an object from the shelf.

SUMMARY

The applicant has found the following issues. As described above, the door is opened when loading an object into an accommodating portion such as a shelf or unloading an object from the accommodating portion. However, when the state is such that another door can be opened at this time, there is a possibility that an object is stolen from the other door.

The present disclosure has been made in view of such a problem, and realizes an opening-closing control device, an opening-closing control system, a task system, an opening-closing control method, and a computer-readable medium that are able to suppress an object from being stolen from a door other than a door that is opened when the object is unloaded from an accommodating portion and when the object is loaded in the accommodating portion.

An opening-closing control device of an aspect of the present disclosure is a device that controls opening and closing of a plurality of doors of an accommodating portion when a robot executes a task of loading or unloading an object to and from the accommodating portion. The opening-closing control device includes:
 a door opening information acquisition unit that acquires information indicating a door to be opened in order to execute the task; and
 a control unit that controls, based on the information indicating the door to be opened in order to execute the task, a lock unit that is arranged corresponding to each of the plurality of doors and that is configured to restrict a door other than the door to be opened in order to execute the task in a closed state.

In the opening-closing control device described above, it is preferable that based on position information of the robot, the door opening information acquisition unit acquire the information indicating the door to be opened in order to execute the task by setting a door in front of which the robot is arranged, among the plurality of doors, as the door to be opened in order to execute the task.

In the opening-closing control device described above, it is preferable that the door opening information acquisition unit acquire the information indicating the door to be opened in order to execute the task, among the plurality of doors, based on task information for loading or unloading the object.

In the opening-closing control device described above, it is preferable that based on the information indicating the door to be opened in order to execute the task, the control unit control a drive unit and the lock unit that are arranged corresponding to the door and that are configured to open the door to be opened in order to execute the task.

An opening-closing control system according to one aspect of the present disclosure includes: the above-mentioned opening-closing control device; and a plurality of drive units that opens and closes each of the door; and a plurality of lock units that restricts each of the doors in a closed state.

It is preferable that the opening-closing control system described above include a detection unit that detects a position of the robot.

A task system according to one aspect of the present disclosure includes: the above-mentioned opening-closing control system; a robot that operates based on task information for loading or unloading the object to and from the accommodating portion; and a task control device that controls the robot and the opening-closing control system.

It is preferable that the task system described above include a task command unit that inputs from outside task information for loading or unloading the object.

It is preferable that the task system described above include an accommodating portion that has a plurality of first doors that is moveable along a first rail, and a second door that is moveable along a second rail, in which: the first rail has a length acquired by adding a width dimension of at least one first door to a total width dimension of the first doors; and the second rail has a length acquired by adding a width dimension of at least one second door to a total width dimension of the second door.

An opening-closing control method of an aspect of the present disclosure is a method that controls opening and closing of a plurality of doors of an accommodating portion when a robot executes a task of loading or unloading an object to and from the accommodating portion, the opening-closing control method including: a step of acquiring information indicating a door to be opened in order to execute the task; and a step of controlling, based on the information indicating the door to be opened in order to execute the task, a lock unit that is arranged corresponding to each of the plurality of doors and that is configured to restrict a door other than the door to be opened in order to execute the task in a closed state.

A computer-readable medium of an aspect of the present disclosure stores a program that controls opening and closing of a plurality of doors of an accommodating portion when a robot executes a task of loading or unloading an object to and from the accommodating portion. The opening-closing control program causes a computer to execute: a process of acquiring information indicating a door to be opened in order to execute the task; and a process of controlling, based on the information indicating the door to be opened in order to execute the task, a lock unit that is arranged corresponding to each of the plurality of doors and that is configured to restrict a door other than the door to be opened in order to execute the task in a closed state.

According to the present disclosure it is possible to realize an opening-closing control device, an opening-closing control system, a task system, an opening-closing control method, and a computer-readable medium that are able to suppress an object from being stolen from a door other than a door that is opened when the object is unloaded from an accommodating portion and when the object is loaded in the accommodating portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. However, the present disclosure is not limited to the following embodiments. Further, in order to clarify the explanation, the following description and drawings are simplified as appropriate.

Figure 1:
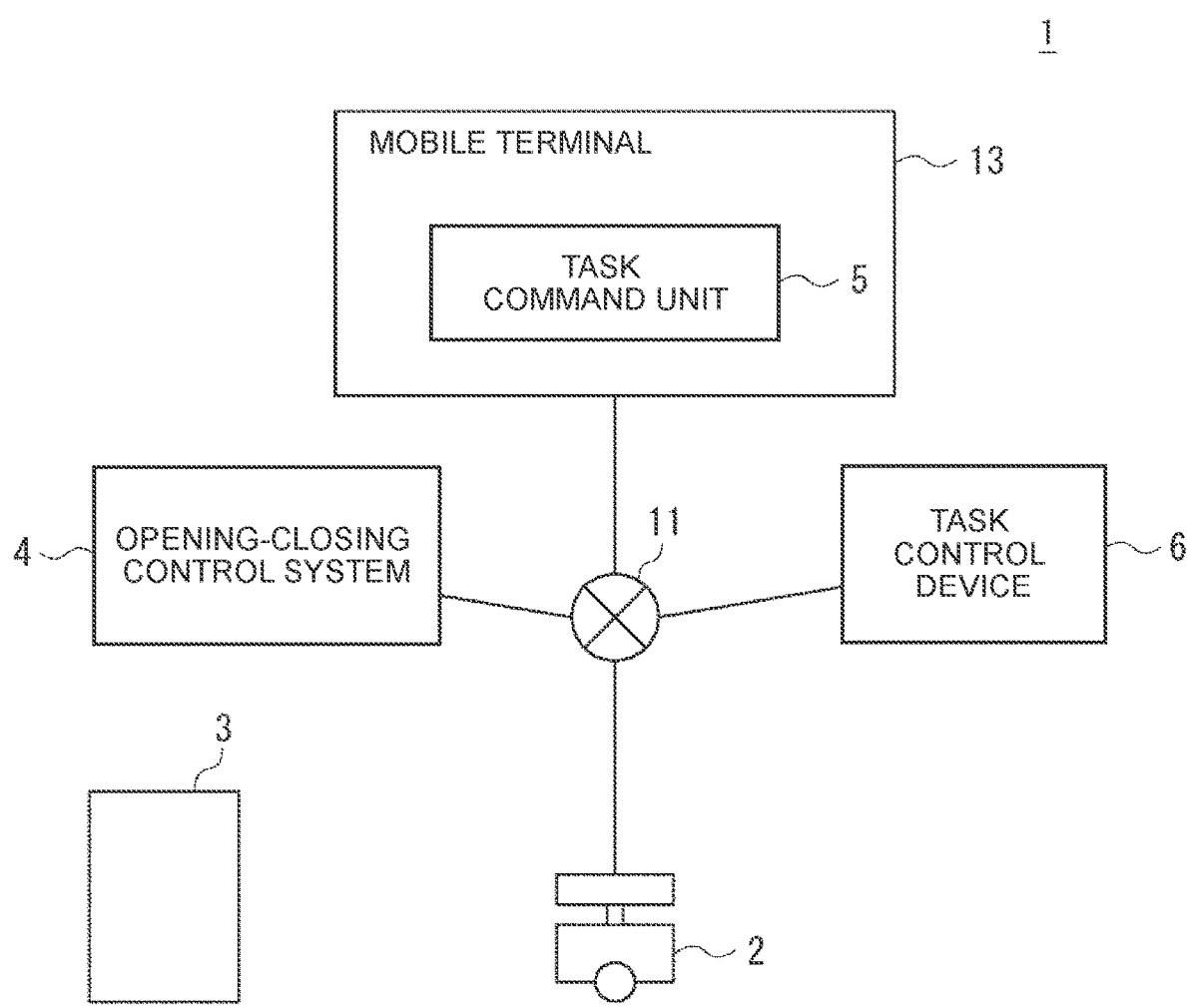
FIG. 1 is a configuration diagram showing a task system according to an embodiment.

FIG. 1 is a configuration diagram showing a task system according to the present embodiment. A task system 1 is used, for example, to execute a task of loading a package to or unloading a package from an accommodating portion 3 using a robot 2 in a facility, and as shown in FIG. 1, the task system 1 includes the robot 2, the accommodating portion 3, an opening-closing control system 4, a task command unit 5, and a task control device 6.

Figure 2:
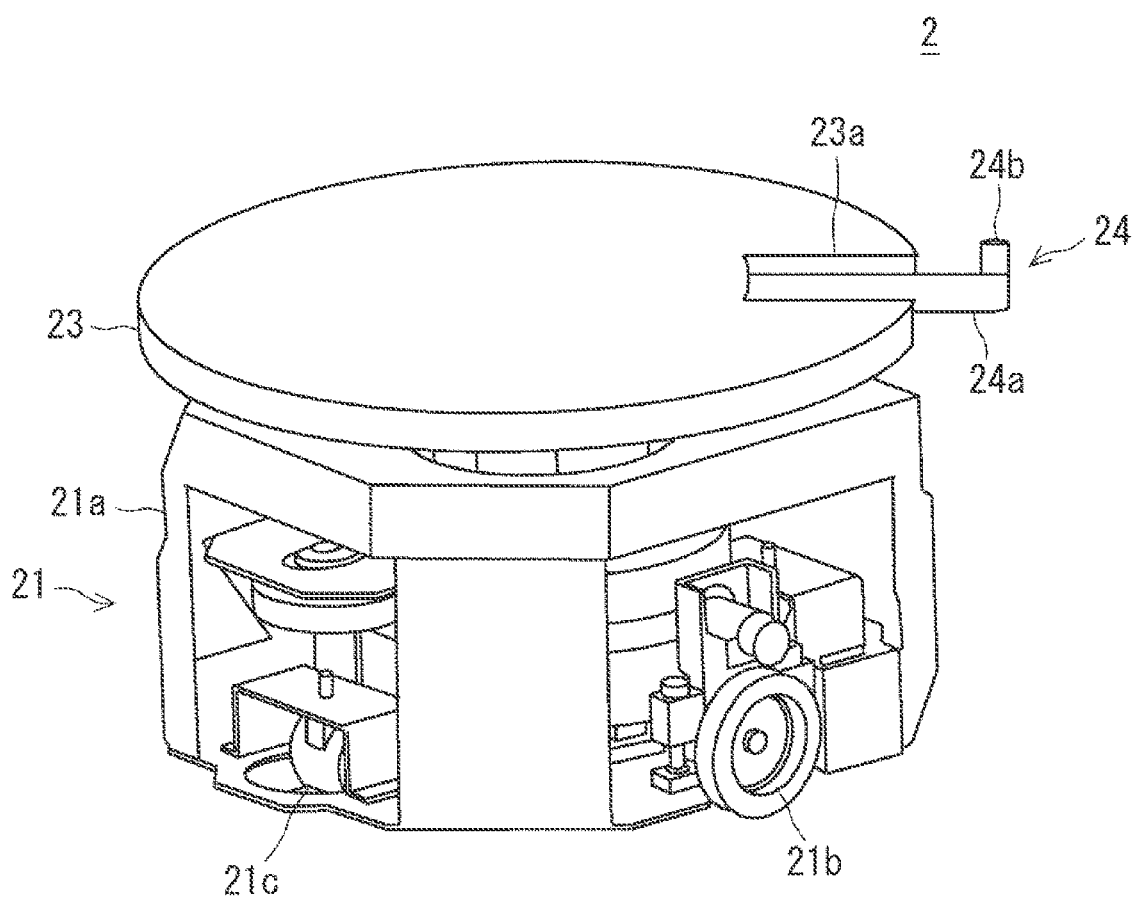
FIG. 2 is a perspective view schematically showing a robot according to the embodiment.
Figure 3:
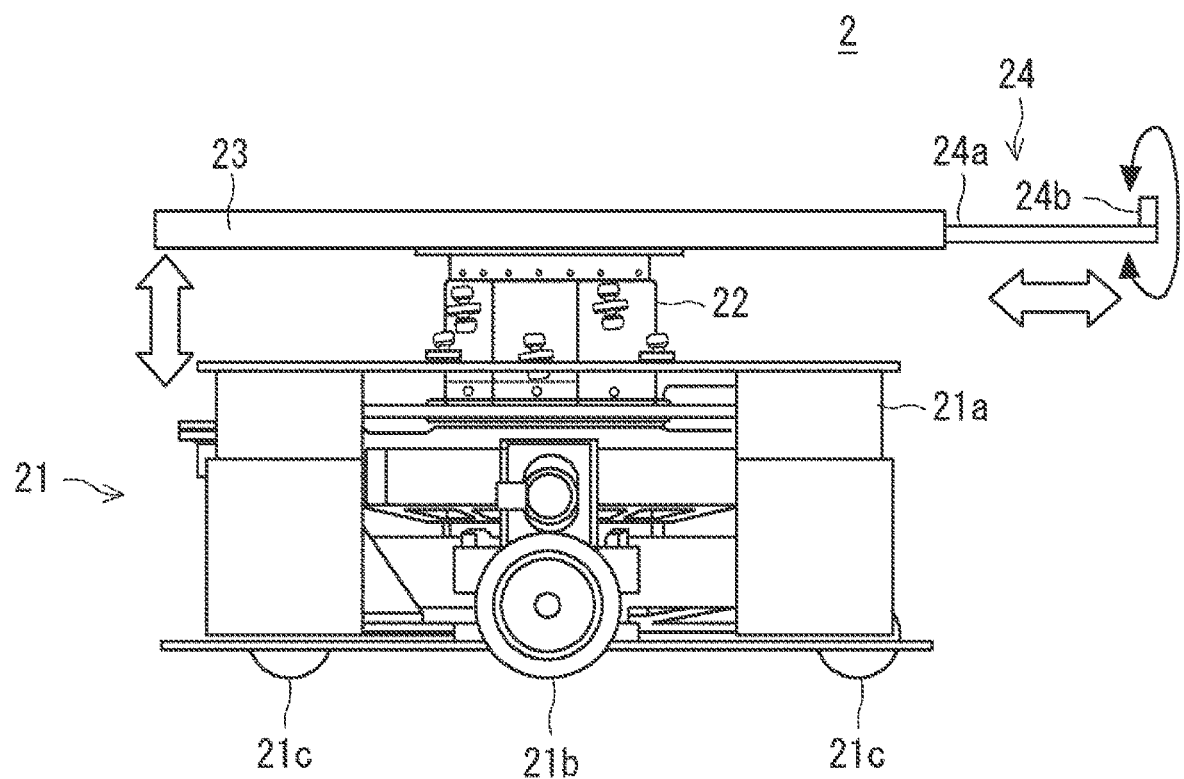
FIG. 3 is a side view schematically showing the robot according to the embodiment.
Figure 4:
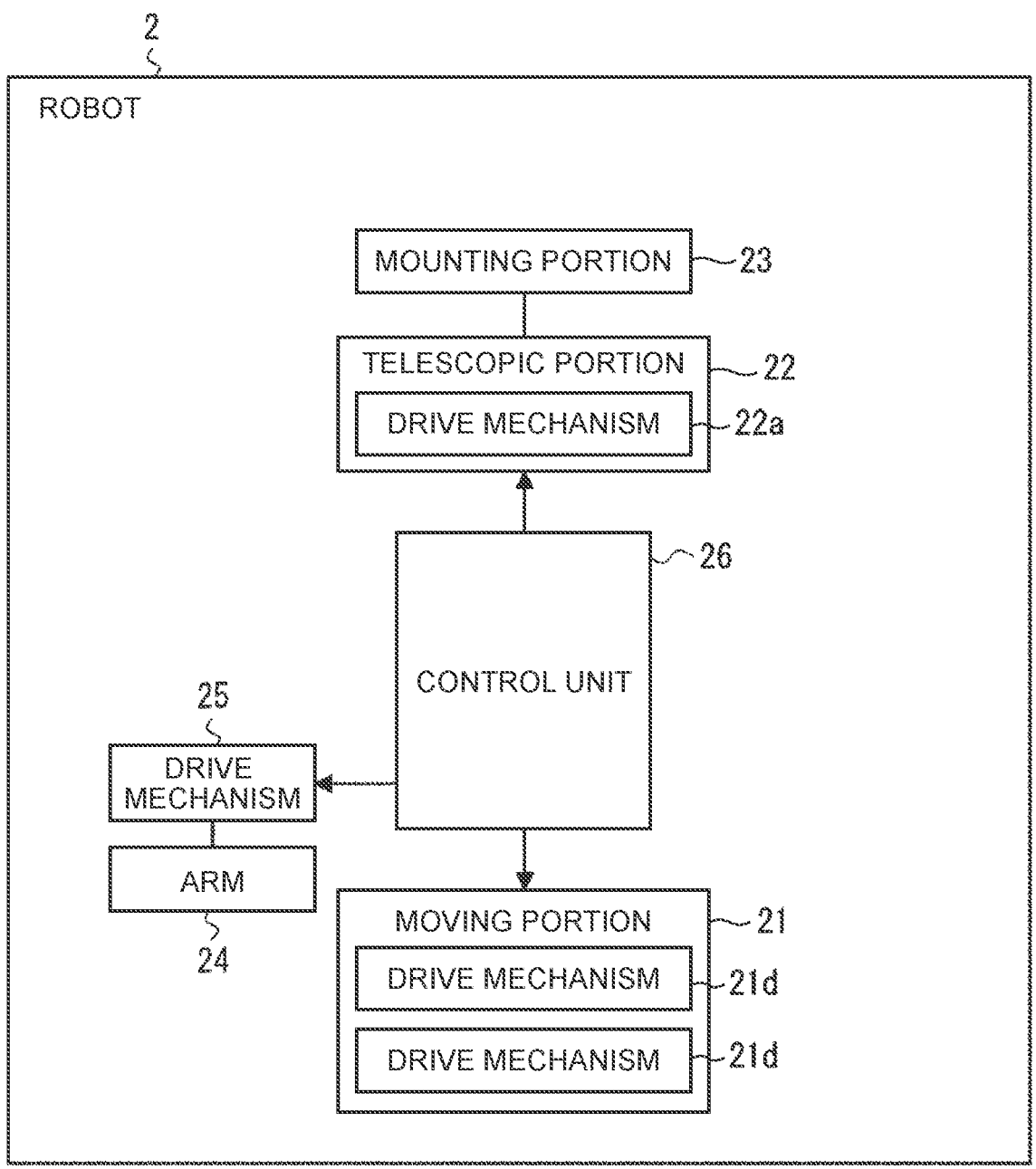
FIG. 4 is a block diagram showing a system configuration of the robot according to the embodiment.

FIG. 2 is a perspective view schematically showing the robot according to the present embodiment. FIG. 3 is a side view schematically showing the robot according to the present embodiment. FIG. 4 is a block diagram showing a system configuration of the robot according to the present embodiment.

The robot 2 is, for example, an autonomous mobile robot and is placed in a facility. As shown in FIGS. 1 to 4, the robot 2 includes a moving portion 21, a telescopic portion 22, a mounting portion 23, an arm 24, a drive mechanism 25, and a control unit 26, and is connected to a network 11. Here, the network 11 is, for example, the Internet, and is constructed by a telephone line network, a wireless communication path, Ethernet (registered trademark), or the like.

The moving portion 21 includes a robot body 21a, a pair of right and left drive wheels 21b that is rotatably provided for the robot body 21a, a pair of front and rear driven wheels 21c, and a pair of drive mechanisms 21d. The drive mechanisms 21d rotatably drive the respective drive wheels 21b.

The drive mechanisms 21d each include a motor, a speed reducer, and the like. Each of the drive mechanisms 21d is driven based on control information received from the control unit 26 and rotates the corresponding drive wheel 21b such that the robot body 21a can move forward and rearward, and rotate.

With this configuration, the robot body 21a can move to an arbitrary position. The configuration of the moving portion 21 is an example, and the present disclosure is not limited to this. For example, the number of the drive wheels 21b and the driven wheels 21c of the moving portion 21 may be arbitrary, and a known configuration can be used as long as the robot body 21a can be moved to an arbitrary position.

The telescopic portion 22 is a telescopic mechanism that expands and contracts in a vertical direction. The telescopic portion 22 may be configured as a telescopic type expansion and contraction mechanism. The telescopic portion 22 includes a drive mechanism 22a having a motor, a speed reducer, and the like, and expands and contracts by the drive mechanism 22a being driven. The drive mechanism 22a is driven based on control information received from the control unit 26.

The mounting portion 23 is provided in an upper portion (at a tip) of the telescopic portion 22. The mounting portion 23 moves up and down due to expansion and contraction of the telescopic portion 22. In the present embodiment, the mounting portion 23 is used for loading a package into or unloading a package from the accommodating portion 3 by the robot 2.

Then, in order to transport the package, the robot 2 can move together with the package while the package is supported by the mounting portion 23. With this configuration, the robot 2 can transport the package. However, in the robot 2, when the mounting portion 23 can be lifted and lowered, a known mechanism can be used instead of the telescopic portion 22.

The mounting portion 23 includes, for example, a plate material serving as an upper surface and a plate material serving as a lower surface. A space for accommodating the arm 24 and the drive mechanism 25 is provided between the upper surface and the lower surface. In the present embodiment, the shape of the mounting portion 23 is, for example, a flat disk shape, but any other shape may be used.

More specifically, in the present embodiment, the mounting portion 23 is provided with a cutout 23a along a line of flow of the arm 24 such that, when the arm 24 is moved, a protruding portion 24b of the arm 24 does not interfere with the mounting portion 23. The cutout 23a is formed at least on the upper surface of the mounting portion 23.

The mounting portion 23 is provided with the arm 24 that is horizontally moved in and out of the mounting portion 23. The arm 24 includes a shaft portion 24a extending in the horizontal direction and the protruding portion 24b that extends in the direction perpendicular to the shaft portion 24a and is provided at the tip of the shaft portion 24a. That is, in the present embodiment, the arm 24 is L-shaped.

The drive mechanism 25 moves the arm 24 in the horizontal direction (that is, the direction along the shaft portion 24a, in other words, the longitudinal direction of the arm 24) and rotates around the shaft portion 24a, based on the control information received from the control unit 26.

The drive mechanism 25 includes, for example, a motor and a linear guide, and moves the arm 24 in the horizontal direction and rotates the arm 24. As the drive mechanism 25, a known mechanism for performing the operations above can be used. The drive mechanism 25 is provided in the mounting portion 23.

As described above, the arm 24 is movable in the horizontal direction, and the protruding portion 24b is rotatable as the arm 24 rotates around the shaft portion 24a. That is, the protruding portion 24b can rotate with the shaft portion 24a as a rotation axis.

The control unit 26 controls the operation of the robot 2 based on the control information received from the task control device 6. That is, the control unit 26 controls the operations of the moving portion 21, the telescopic portion 22, and the arm 24. The control unit 26 can control the rotation of each drive wheel 21b and move the robot body 21a to an arbitrary position by transmitting the control information to the drive mechanism 21d of the moving portion 21.

Further, the control unit 26 can control the height of the mounting portion 23 by transmitting the control information to the drive mechanism 22a of the telescopic portion 22. Further, the control unit 26 can control the horizontal movement of the arm 24 and the rotation around the shaft portion 24a by transmitting the control information to the drive mechanism 25.

Here, the control unit 26 may control movement of the robot 2 by executing known control such as feedback control and robust control based on rotation information of the drive wheels 21b detected by rotation sensors (for example, an encoder) provided for the drive wheels 21b.

Further, the control unit 26 may cause the robot 2 to move autonomously by controlling the moving portion 21 based on information such as distance information detected by a distance sensor such as a camera or an ultrasonic sensor provided for the robot 2 and map information on moving environment.

Figure 5:
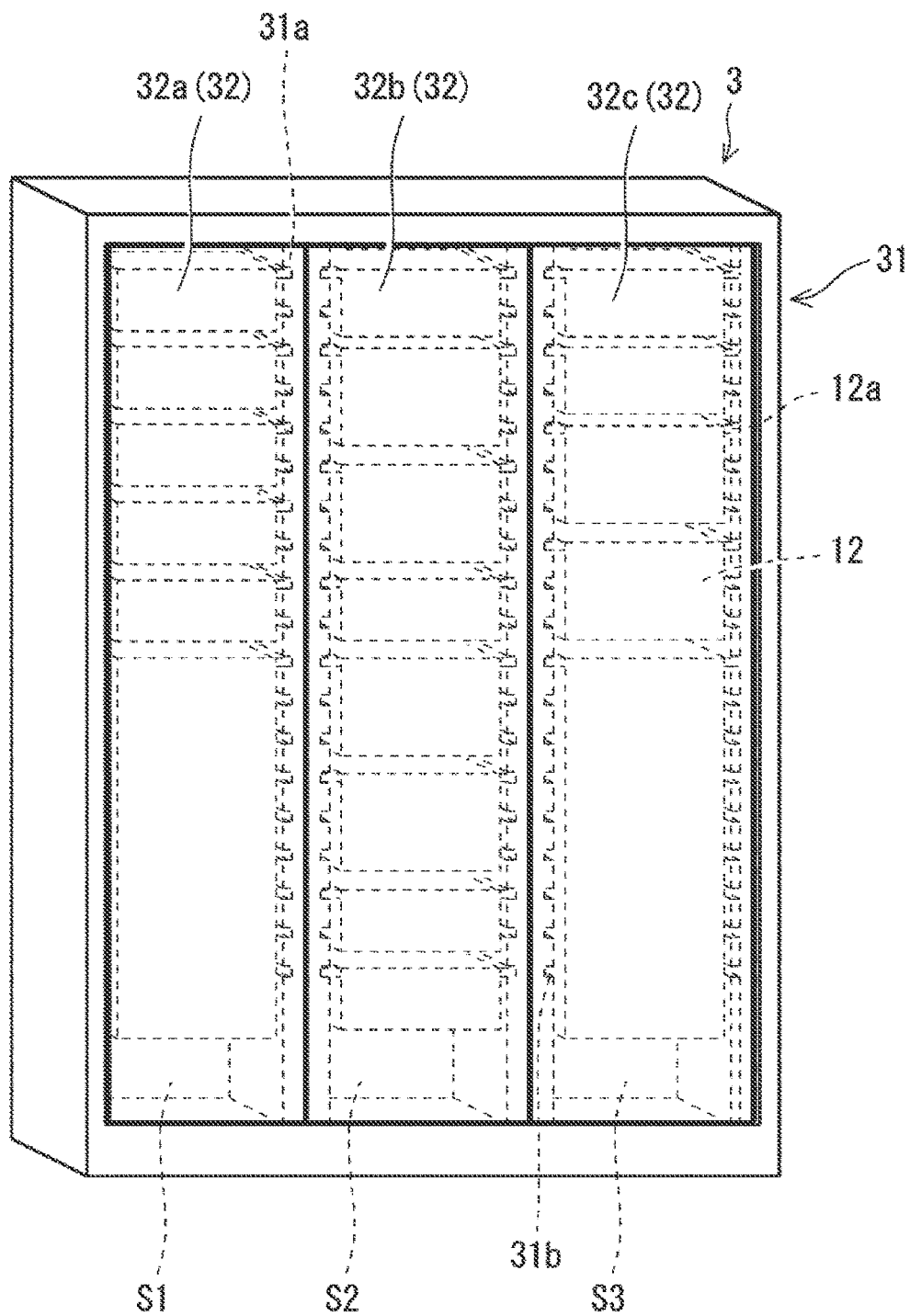
FIG. 5 is a perspective view of the accommodating portion of the embodiment as viewed from a front side.
Figure 6:
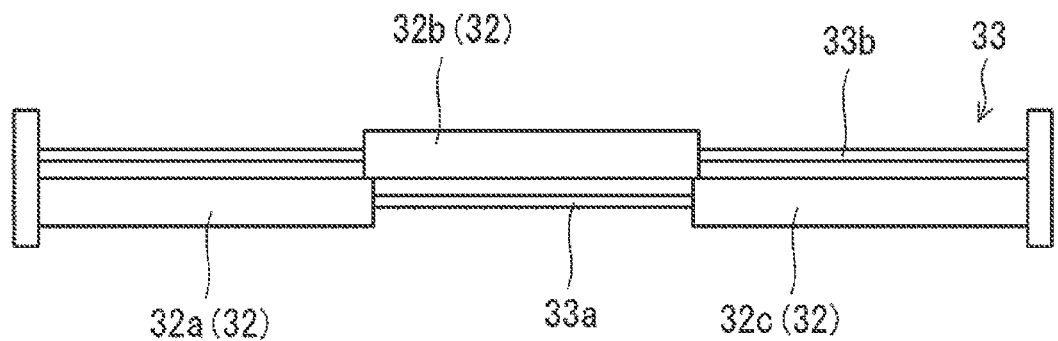
FIG. 6 is a diagram for describing the arrangement of doors of the accommodating portion according to the embodiment.

The accommodating portion 3 is disposed in the facility and loads or unloads the package carried by the robot 2. FIG. 5 is a perspective view of the accommodating portion of the present embodiment as viewed from a front side. FIG. 6 is a diagram for describing the arrangement of the doors of the accommodating portion according to the present embodiment, and shows a state in which all the doors are closed. Here, in order to clarify the description, the side on which the robot 2 loads or unloads the package is described as the front surface of the accommodating portion 3.

As shown in FIGS. 5 and 6, the accommodating portion 3 includes an accommodating portion main body 31, a door 32, and a sliding portion 33, and is configured to be capable of housing a plurality of packages 12. The accommodating portion main body 31 has a rectangular frame as a basic form, and an open portion is formed at least on the front surface of the accommodating portion main body 31. The inside of the accommodating portion main body 31 is divided into a plurality of spaces by a partition 31a.

The accommodating portion main body 31 of the present embodiment is divided into a first space S1, a second space S2, and a third space S3 by a partition 31a. The first space S1, the second space S2, and the third space S3 are arranged in the right-left direction of the accommodating portion main body 31 when viewed in a direction facing the front of the accommodating portion main body 31.

In these spaces S1, S2, S3, a plurality of pairs of rails 31b are arranged so as to face each other in each of the spaces S1, S2, S3 at intervals in the vertical direction. The rail 31b extends in the front-rear direction of the accommodating portion main body 31.

As shown in FIG. 5, the door 32 is arranged on the front side of each of the spaces S1, S2, S3 so as to cover the open portion of each of the spaces S1, S2, S3. The door 32 has a substantially rectangular shape when viewed in a direction facing the front of the accommodating portion 3.

As shown in FIG. 6, the accommodating portion 3 of the present embodiment has, as the door 32, a first door 32a covering the open portion of the first space S1, a second door 32b covering the open portion of the second space S2, and a third door 32c covering the third space S3. That is, the accommodating portion 3 includes a number of doors 32 corresponding to the number of compartments in the space.

As shown in FIG. 6, the sliding portion 33 includes a first rail 33a and a second rail 33b. The first rail 33a is, for example, arranged on the front side of the accommodating portion main body 31 and on the upper side of the accommodating portion main body 31, and extends in the right-left direction of the accommodating portion main body 31.

The first rail 33a slidably suspends and supports the first door 32a and the third door 32c. For example, a roller provided on the upper side of the first door 32a and the third door 32c is hooked on the first rail 33a. As a result, the first door 32a and the third door 32c can move in the right-left direction of the accommodating portion main body 31 along the first rail 33a.

The first rail 33a has a length obtained by adding the width dimension of another door 32 to the total length of the width dimension of the first door 32a and the width dimension of the third door 32c. That is, the first rail 33a has the total length of the width dimension of the three doors 32, and the width dimension area of one door 32 is used to slide the first door 32a or the third door 32c.

The second rail 33b is arranged on the back side of the accommodating portion main body 31 with respect to the first rail 33a. The second rail 33b is arranged, for example, on the front side of the accommodating portion main body 31 and on the upper side of the accommodating portion main body 31. The second rail 33b also extends in the right-left direction of the accommodating portion main body 31.

The second rail 33b slidably suspends and supports the second door 32b. For example, a roller provided on the upper side of the second door 32b is hooked on the second rail 33b. As a result, the second door 32b can move in the right-left direction of the accommodating portion main body 31 along the second rail 33b.

The second rail 33b has a length obtained by adding the width dimension of the two doors 32 to the width dimension of the second door 32b. That is, the second rail 33b also has the total length of the width dimensions of the three doors 32, and the second door 32b can be slid using the width dimension region of the two doors 32.

However, the second door 32b may be suspended and supported by the first rail 33a, and the first door 32a and the third door 32c may be suspended and supported by the second rail 33b. That is, the three doors may be assigned to the first rail 33a and the second rail 33b.

Further, the second rail 33b only needs to have a length in which the second door 32b can be opened, and only needs to have the total length of the width dimensions of at least two second doors 32b, for example.

Figure 7:
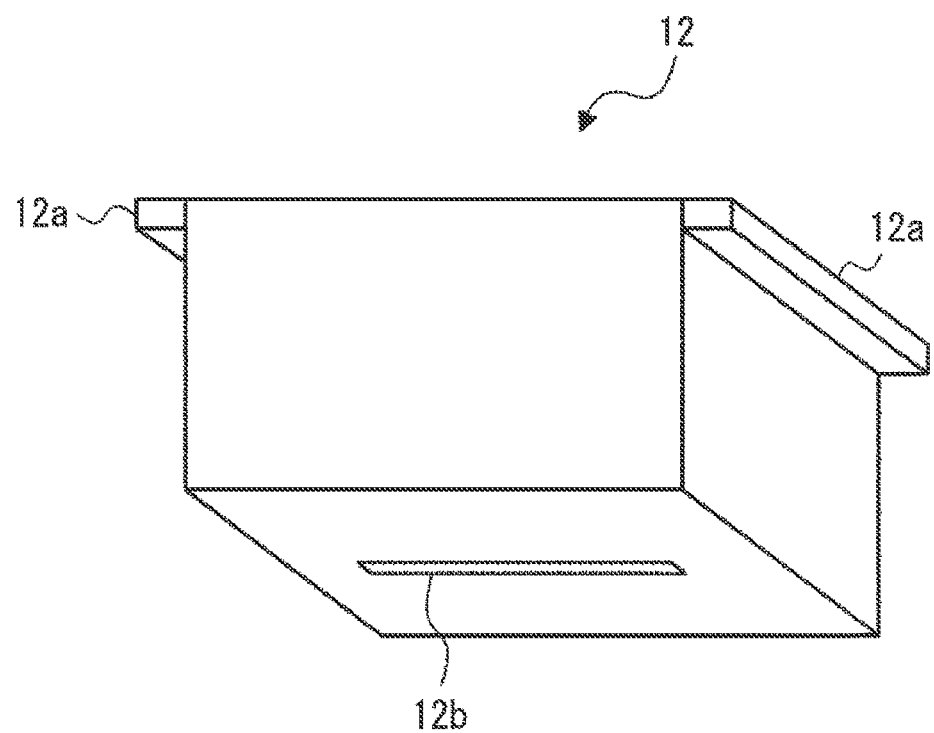
FIG. 7 is a perspective view showing a package loaded into or unloaded from an accommodating portion using a robot.

FIG. 7 is a perspective view showing a package loaded into or unloaded from an accommodating portion using a robot. As shown in FIG. 7, the package 12 is a container having a box shape as a basic form, and for example, brims 12a are provided on both sides of the package 12.

Since the brims 12a are supported by the pair of rails 31b of the accommodating portion 3, the package 12 is supported in the respective spaces S1, S2, S3 of the accommodating portion 3. With this configuration, the package 12 can move inside the accommodating portion 3 in the front-rear direction of the accommodating portion 3 along the pair of rails 31b of the accommodating portion 3.

Therefore, the package 12 can be unloaded from the accommodating portion 3 by pulling out the package 12 from the inside of the accommodating portion 3. In contrast, by pushing the package 12 into the accommodating portion 3, the package 12 can be loaded into the accommodating portion 3. However, the package 12 only needs to have a configuration that can be supported by the pair of rails 31b of the accommodating portion 3.

As shown in FIG. 7, a groove 12b for hooking a protruding portion 24b of the arm 24 is provided on the bottom surface of the package 12 at a predetermined position. Any object can be accommodated inside the package 12.

Figure 8:
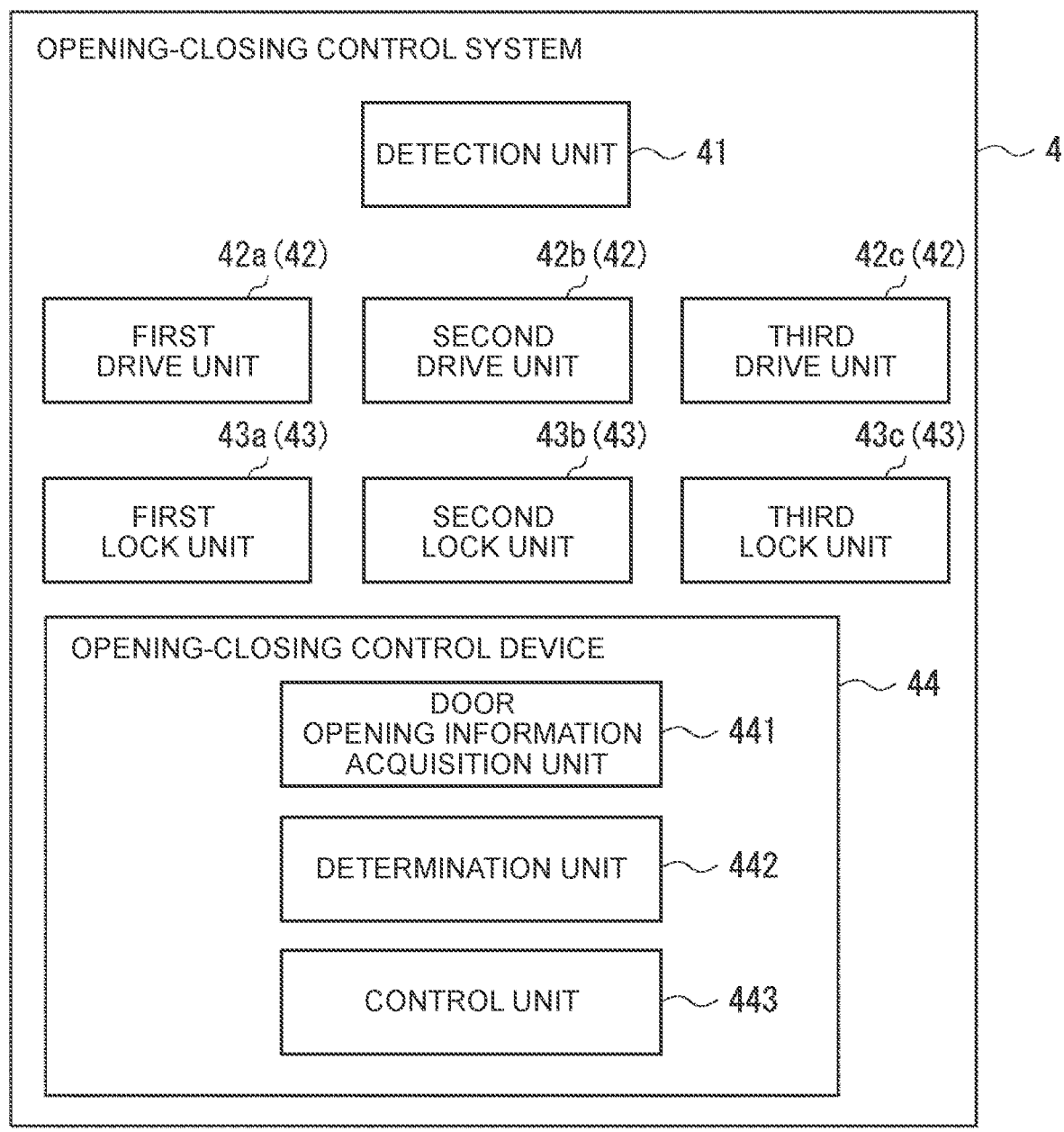
FIG. 8 is a block diagram showing functional elements of an opening-closing control system according to the embodiment.

FIG. 8 is a block diagram showing functional elements of an opening-closing control system according to the present embodiment. As shown in FIG. 8, the opening-closing control system 4 includes a detection unit 41, a drive unit 42, a lock unit 43, and an opening-closing control device 44, and is connected to the network 11. The detection unit 41 detects the position of the robot 2.

The detection unit 41 can be configured by, for example, an infrared camera, and is provided in the accommodating portion 3 so that the robot 2 can be detected in the facility in which the accommodating portion 3 is arranged. However, as long as the detection unit 41 can detect the position of the robot 2 moving in the facility, the type and arrangement of the sensors are not limited.

The drive unit 42 opens and closes the door 32. In the opening-closing control system 4 of the present embodiment, as the drive unit 42, a first drive unit 42a that opens and closes the first door 32a, a second drive unit 42b that opens and closes the second door 32b, and a third drive unit 42c that opens and closes the third door 32c are provided.

The first drive unit 42a, the second drive unit 42b, and the third drive unit 42c can be configured by, for example, a drive mechanism such as a linear engine having an electromagnet and a permanent magnet. The first drive unit 42a, the second drive unit 42b, and the third drive unit 42c are, for example, on the front side of the accommodating portion main body 31, and on the upper side of the accommodating portion main body 31, it is preferable that they are arranged corresponding to each of the doors 32a, 32b, 32c.

However, in the first drive unit 42a, the second drive unit 42b, and the third drive unit 42c, if each of the doors 32a, 32b, 32c can be opened and closed, a known drive mechanism can be used, and the arrangement of each of the drive units 42a, 42b, and 42c is also not limited.

The opening-closing control system 4 of the present embodiment in which the lock unit 43 restricts the door 32 in a closed state includes as the lock unit 43, a first lock unit 43a that restricts the first door 32a in a closed state, a second lock unit 43b that restricts the second door 32b in a closed state, and a third lock unit 43c that restricts the third door 32c in a closed state.

The first lock unit 43a, the second lock unit 43b, and the third lock unit 43c can be configured by, for example, a lock mechanism such as an actuator in which a pin moves linearly. It is preferable that the first lock unit 43a, the second lock unit 43b, and the third lock unit 43c be, for example, on the front side of the accommodating portion main body 31, and be arranged on the lower side of the accommodating portion main body 31 so as to correspond to the doors 32a, 32b, 32c, respectively.

With the pins of the first lock unit 43a, the second lock unit 43b, and the third lock unit 43c protruding to the inside of the accommodating portion main body 31, the first lock unit 43a, the second lock unit 43b, and the third lock unit 43c are fitted to recess portions formed on bottom surfaces of the doors 32a, 32b, 32c. As a result, the doors 32a, 32b, 32c can be restricted to be in a closed state.

However, if the first lock unit 43a, the second lock unit 43b, and the third lock unit 43c can be restricted so that the doors 32a, 32b, 32c are closed, a known lock mechanism can be used, and the arrangement of the respective lock units 43a, 43b, 43c is also not limited.

As shown in FIG. 8, the opening-closing control device 44 includes a door opening information acquisition unit 441, a determination unit 442, and a control unit 443. The door opening information acquisition unit 441 acquires the detection information of the robot 2 from the detection unit 41. The door opening information acquisition unit 441 will be described in detail later. Based on the detection information, the door opening information acquisition unit 441 certifies that the door in front of which the robot 2 is arranged among the first door 32a, the second door 32b, and the third door 32c is the door to be opened in order to execute the task. As a result, the door opening information acquisition unit 441 acquires information indicating the door to be opened in order to execute the task.

Although the details will be described later, the determination unit 442 determines whether the mounting portion 23 of the robot 2 has reached the height at which the package 12 is arranged, and whether the mounting portion 23 of the robot 2 has started descending.

Although the details will be described later, the control unit 443 controls the first drive unit 42a, the second drive unit 42b, the third drive unit 42c, the first lock unit 43a, the second lock unit 43b, and the third lock unit 43c so as to open the door of either the first door 32a, the second door 32b, or the third door 32c while maintaining the restricted state in which the other doors are closed, based on the information indicating the door to be opened in order to execute the task.

That is, the control unit 443 can open and close either the first door 32a, the second door 32b, or the third door 32c by transmitting control information to the drive units 42a, 42b, 42c and the lock units 43a, 43b, 43c.

At this time, for example, when the first drive unit 42a, the second drive unit 42b, and the third drive unit 42c are configured of a linear engine, the control unit 443 controls the strength of the magnetic force and the direction of magnetism of the electromagnet by adjusting the current flowing through the electromagnet of the respective drive units 42a, 42b, 42c. The door opening information acquisition unit 441, determination unit 442, and control unit 443 may be provided in, for example, the accommodating portion 3, or may be arranged outside the accommodating portion 3.

The task command unit 5 is operated by a user of the robot 2 or another person in order to input (command) task information for loading or unloading the package 12. As shown in FIG. 1, the task command unit 5 is often mounted on a mobile terminal 13 such as a smartphone owned by the user, and identification information of the package 12 displayed on a display unit of the mobile terminal 13 and task type information for loading or unloading the package 12 can be selected to issue a command. The task command unit 5 is connected to the network 11. The task command unit 5 only needs to be capable of inputting task information necessary for loading or unloading the package 12.

Figure 9:
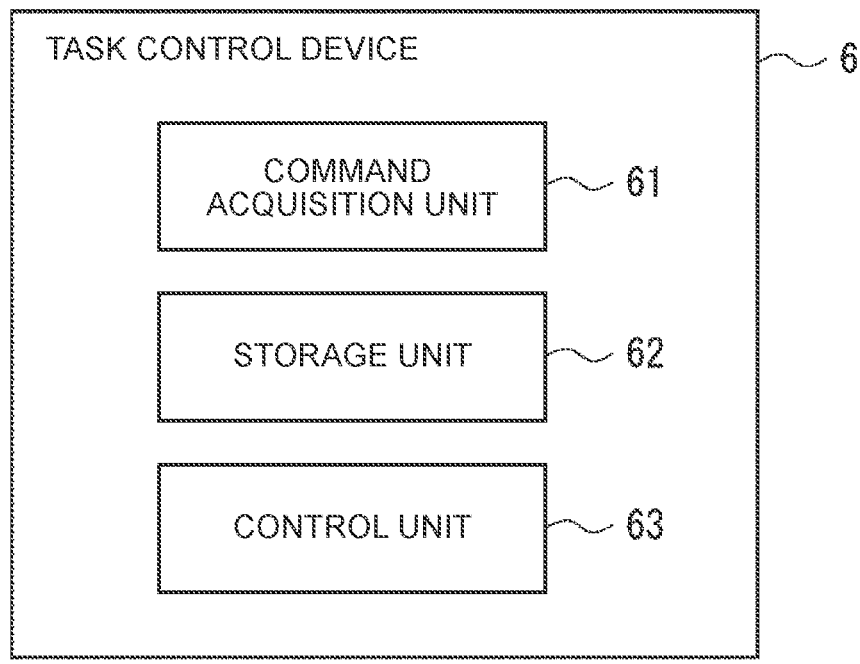
FIG. 9 is a block diagram showing functional elements of a task control device according to the embodiment.

The task control device 6 controls the robot 2 and the opening-closing control system 4. FIG. 9 is a block diagram showing functional elements of a task control device according to the present embodiment. As shown in FIG. 9, the task control device 6 includes a command acquisition unit 61, a storage unit 62, and a control unit 63, and is connected to the network 11.

The command acquisition unit 61 acquires, for example, the task information received from the task command unit 5 for loading or unloading the package 12. Note that, the command acquisition unit 61 may be configured of the task command unit 5. In short, the command acquisition unit 61 only needs to acquire the task information input by the user.

The storage unit 62 includes the identification information of the package 12, the task type information for loading or unloading the package 12, the position information of each space S1, S2, S3, the identification information of the doors 32a, 32b, 32c, the identification information of each drive unit 42a, 42b, 42c, the identification information of each lock unit 43a, 43b, 43c, the position information of the rail 31b in each space S1, S2, S3, and the like.

Here, it is preferable that the identification information of the package 12, the position information of each space S1, S2, S3, and the position information of the rail 31b in each space S1, S2, S3 be associated with each other. Further, it is preferable that the position information of each space S1, S2, S3, the identification information of each door 32a, 32b, 32c, the identification information of each drive unit 42a, 42b, 42c, and the identification information of each lock unit 43a, 43b, 43c be associated with each other.

Although the details will be described later, the control unit 63 controls the control unit 26 of the robot 2 and the control unit 443 of the opening-closing control device 44 based on the task information for loading or unloading the package 12. That is, the control unit 63 controls the control unit 26 of the robot 2 and the control unit 443 of the opening-closing control device 44 in order to execute a desired task.

Here, for example, based on the detection results of the encoders provided on the telescopic portion 22 and the arm 24 of the robot 2, the control unit 63 may receive from the control unit 26 of the robot 2, information indicating that the mounting portion 23 has reached the desired height when the robot 2 executes the task and information indicating that the arm 24 has completed loading or unloading the package 12. That is, the control unit 63 may receive information indicating the progress status of the task by the robot 2 from the control unit 26 of the robot 2.

Next, a flow of executing a task using the task system 1 according to the present embodiment will be described. Here, in the following description, it is assumed that the robot 2 executes a task of unloading the package 12 accommodated in the third space S3 of the accommodating portion 3 and transporting the package 12. Further, it is assumed that all the doors 32a, 32b, 32c are restricted in a state of being closed by the lock unit 43.

Figure 10:
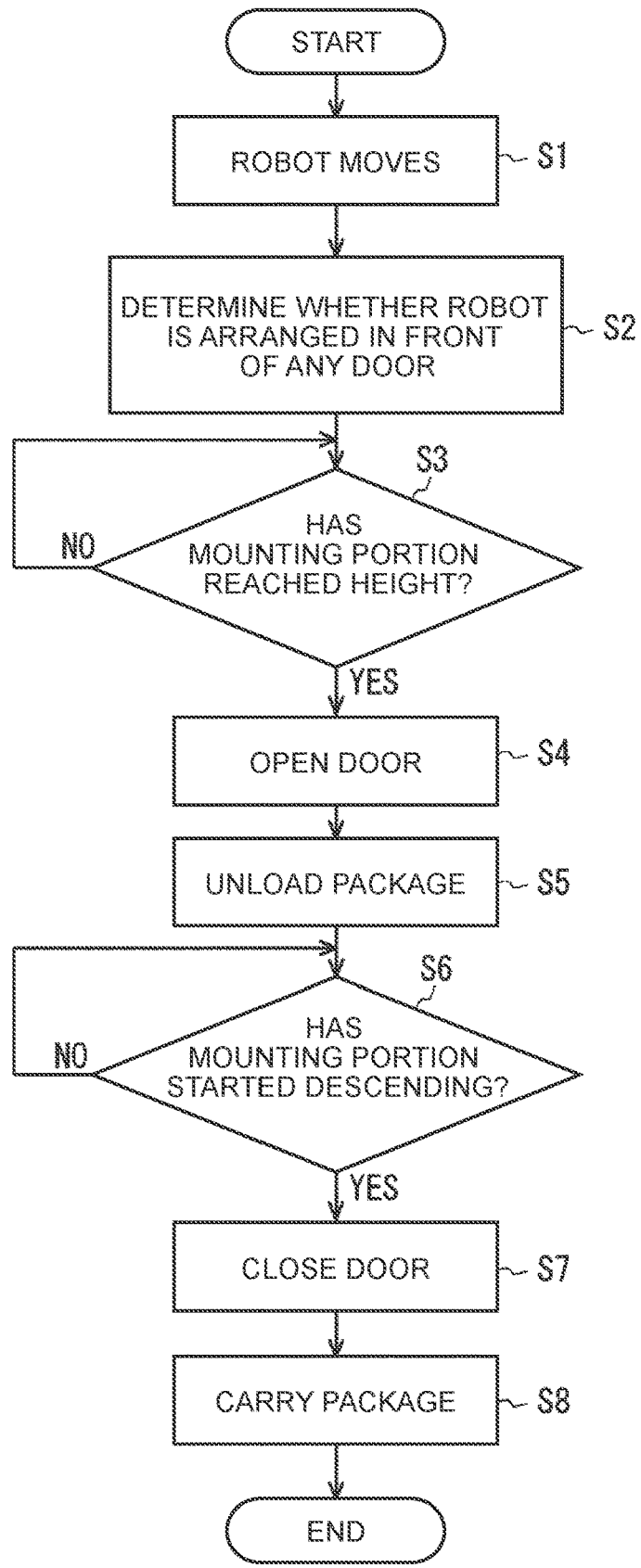
FIG. 10 is a flowchart showing a flow of executing a task using the task system according to the embodiment.
Figure 11:
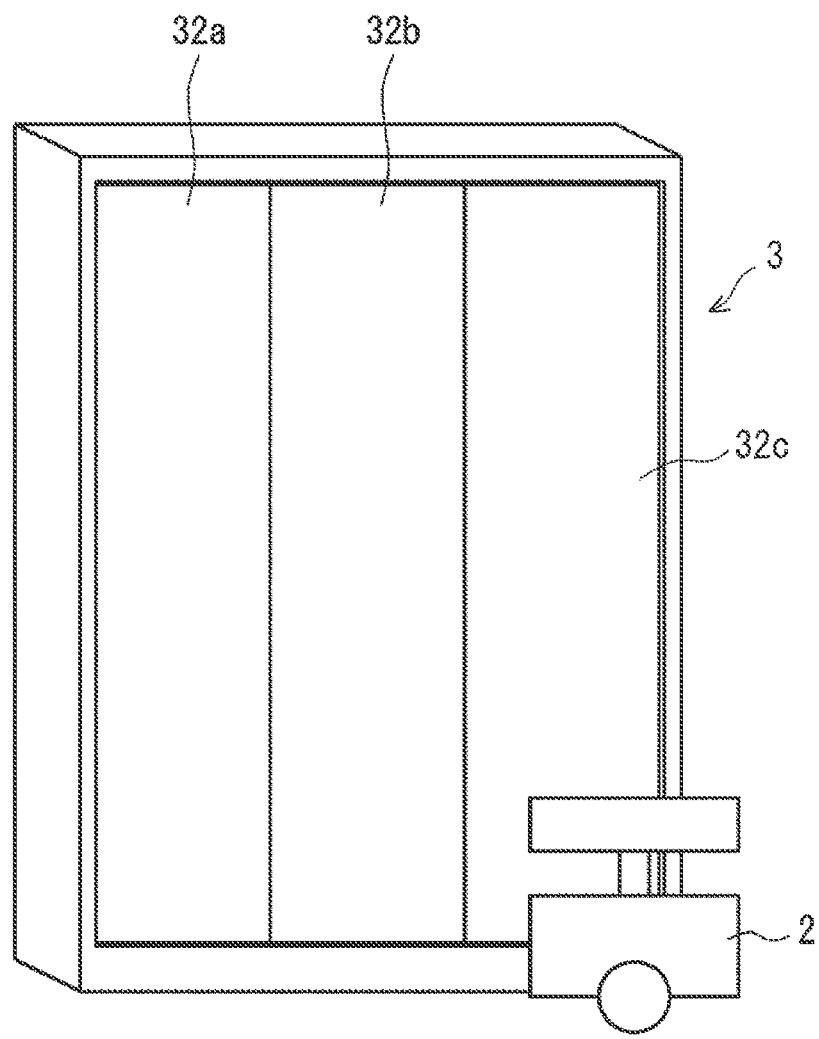
FIG. 11 is a diagram showing a state in which the robot has arrived at the front of a third door of the accommodating portion.
Figure 12:
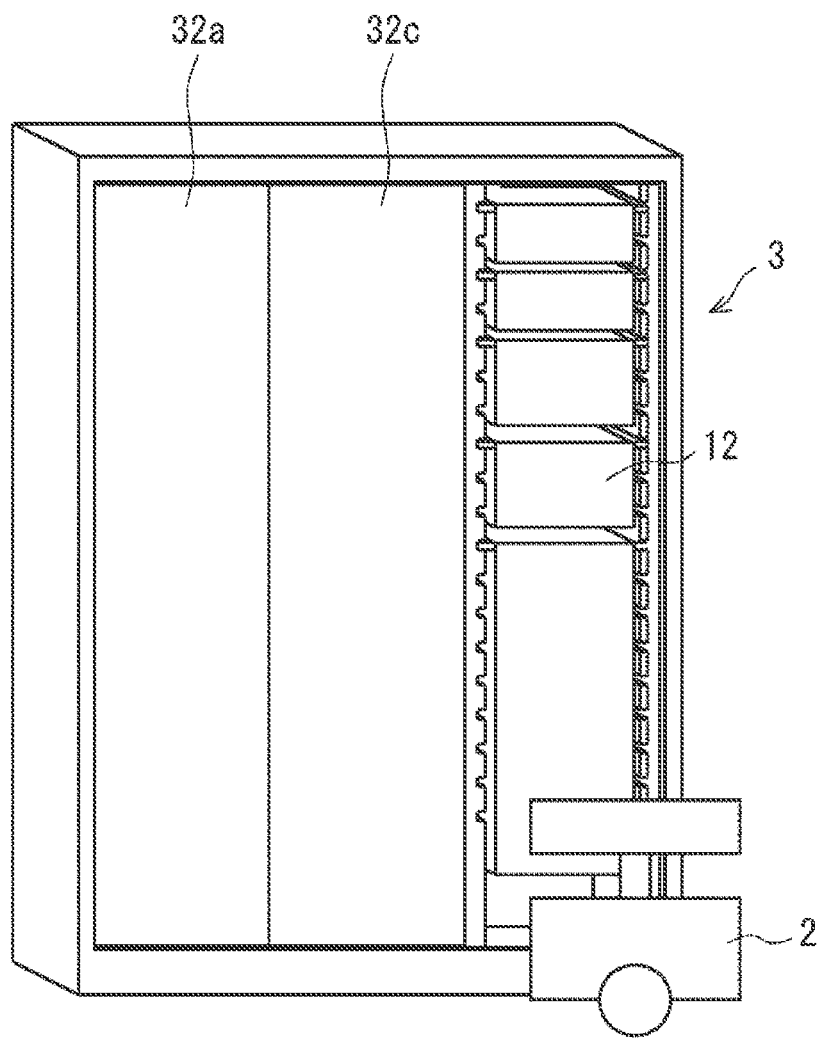
FIG. 12 is a diagram showing a state in which the third door of the accommodating portion is open.
Figure 13:
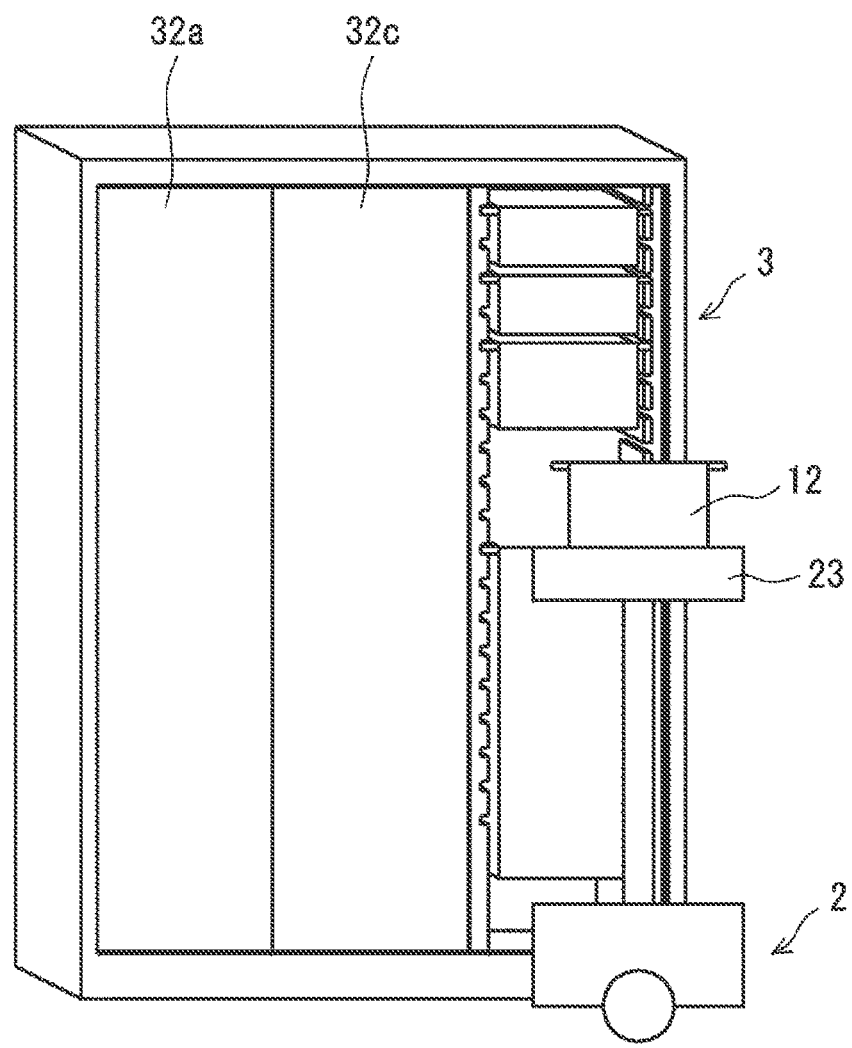
FIG. 13 is a diagram showing a state in which the robot unloads a desired package from the accommodating portion.
Figure 14:
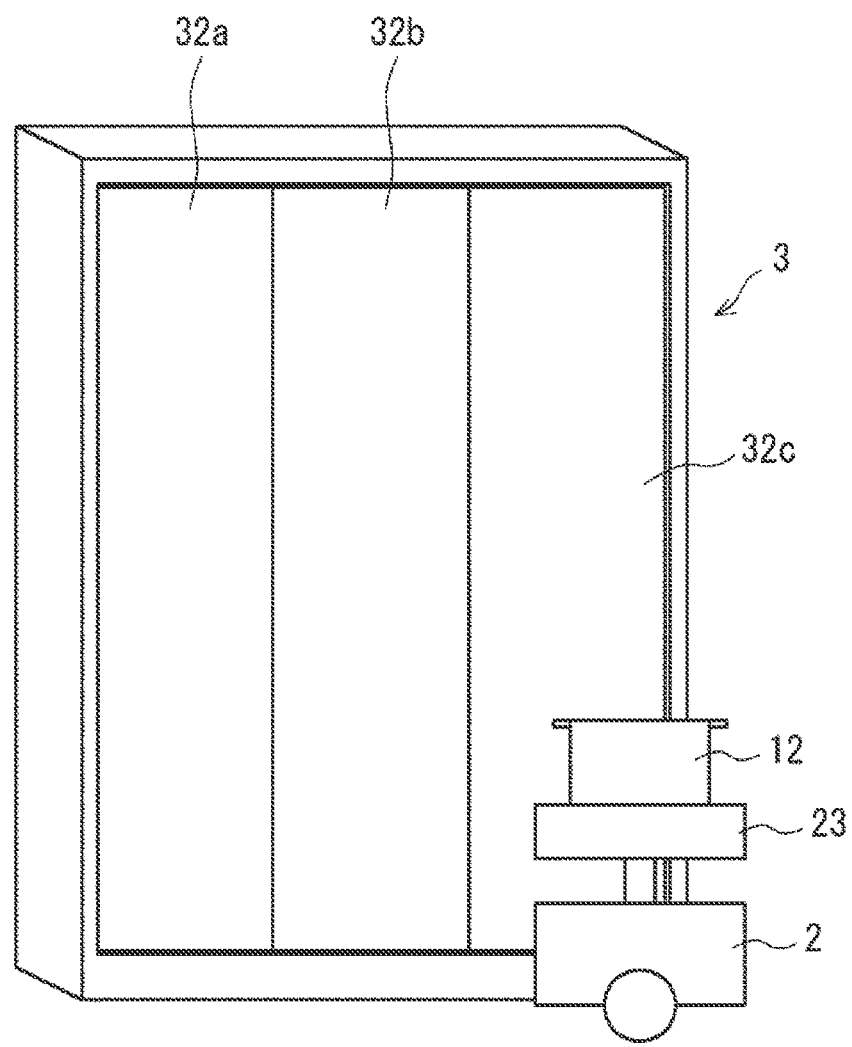
FIG. 14 is a diagram showing a state in which the third door of the accommodating portion is closed.
Figure 15:
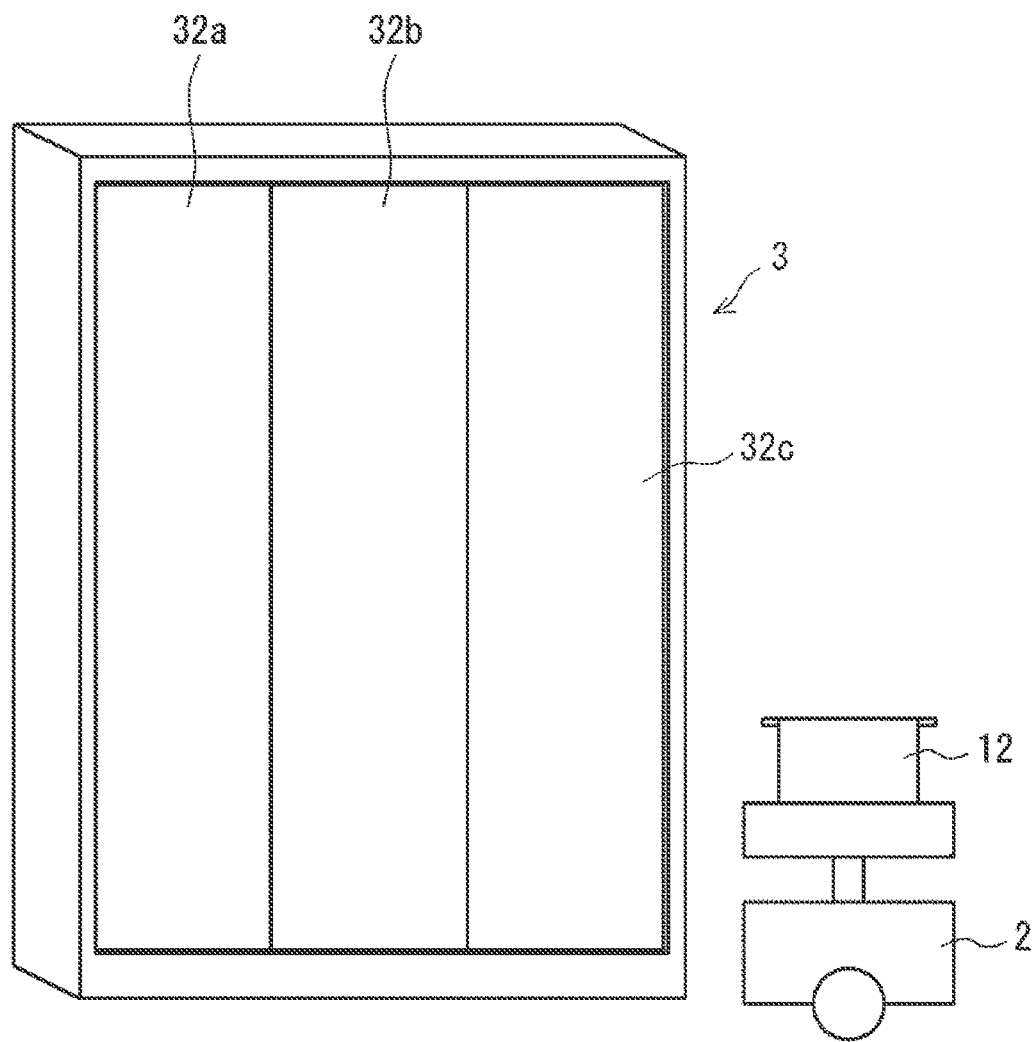
FIG. 15 is a diagram showing a state in which the robot carries the package.

FIG. 10 is a flowchart showing a flow of executing a task using the task system according to the present embodiment. FIG. 11 is a diagram showing a state in which the robot has arrived at the front of the third door of the accommodating portion. FIG. 12 is a diagram showing a state in which the third door of the accommodating portion is open. FIG. 13 is a diagram showing a state in which the robot unloads a desired package from the accommodating portion. FIG. 14 is a diagram showing a state in which the third door of the accommodating portion is closed. FIG. 15 is a diagram showing a state in which the robot carries the package.

First, when the user inputs the task information via the task command unit 5 mounted on the mobile terminal 13, the task command unit 5 transmits information indicating the task information to the task control device 6. As a result, the control unit 63 of the task control device 6 transmits the control information to each control unit 26, 443 in order to issue a command of starting the task to the control unit 26 of the robot 2 and the control unit 443 of the opening-closing control device 44.

Next, the control unit 26 of the robot 2 controls the drive mechanism 21d of the moving portion 21 in order to move the robot 2 toward the front of the third door 32c of the accommodating portion 3 (S1). At the same time, the control unit 443 of the opening-closing control device 44 controls the detection unit 41 in order to detect the robot 2 present in the facility.

When the detection unit 41 detects the robot 2 present in the facility, the detection unit 41 transmits the detection information to the door opening information acquisition unit 441 of the opening-closing control device 44. Based on the detection information, the door opening information acquisition unit 441 determines which of the doors 32a, 32b, 32c the robot 2 is arranged in front of among the first door 32a, the second door 32b, and the third door 32c (S2). Such a determination is continued while the task is being executed by the robot 2.

Then, when the robot 2 reaches the front of the third door 32c of the accommodating portion 3 as shown in FIG. 11, the control unit 26 of the robot 2 controls the drive mechanism 22a of the telescopic portion 22 so that the mounting portion 23 reaches the height at which the desired package 12 is accommodated.

At this time, the robot 2 autonomously moves to the front of the third door 32c based on the position information of the third space S3 of the accommodating portion 3. Then, the drive mechanism 22a of the telescopic portion 22 of the robot 2 autonomously raises the mounting portion 23 to the height at which the package 12 is accommodated based on the position information of the rail 31b associated with the identification information of the desired package 12.

At the same time, based on the determination result of which of the doors 32a, 32b, 32c the robot 2 is arranged in front of, the door opening information acquisition unit 441 of the opening-closing control device 44 certifies that the door in front of which the robot 2 is arranged (that is, the third door 32c) is the door to be opened in order to execute the task.

For example, when the robot 2 invades a preset range on the front side of each of the doors 32a, 32b, 32c, the door opening information acquisition unit 441 can certify that the door having the region in which the robot 2 has invaded as the front side is the door to be opened in order to execute the task.

The determination unit 442 of the opening-closing control device 44 determines whether the mounting portion 23 of the robot 2 has reached the height at which the desired package 12 is accommodated, based on the progress status of the task by the robot 2 indicated by the information received from the control unit 26 of the robot 2 (S3).

When the mounting portion 23 of the robot 2 does not reach the desired height at which the package 12 is accommodated (NO in S3), the opening-closing control device 44 returns to step S3 while maintaining the restricted state in which all the doors 32a, 32b, 32c of the accommodating portion 3 are closed.

In contrast, when the mounting portion 23 of the robot 2 reaches the height at which the desired package 12 is accommodated (YES in S3), the control unit 443 of the opening-closing control device 44 controls the third drive unit 42c and the third lock unit 43c in order to open the third door 32c of the accommodating portion 3 as shown in FIG. 12 (S4). Then, the control unit 443 of the opening-closing control device 44 transmits to the control unit 63 of the task control device 6, information regarding that the third door 32c of the accommodating portion 3 has been opened.

At this time, the control unit 443 of the opening-closing control device 44 controls the first drive unit 42a, the second drive unit 42b, the first lock unit 43a, and the second lock unit 43b so that the restricted state in which the first door 32a and the second door 32b that are the other doors of the accommodating portion 3 are closed is maintained.

Next, the control unit 63 of the task control device 6 transmits to the control unit 26 of the robot 2, information indicating that the third door 32c of the accommodating portion 3 has been opened. As shown in FIG. 13, the control unit 26 of the robot 2 controls the drive mechanism 25 of the arm 24 in order to unload the desired package 12 from the accommodating portion 3 and place it on the mounting portion 23 (S5).

At this time, since the first door 32a and the second door 32b that are the other doors of the accommodating portion 3 are maintained restricted state in which the doors are closed, it is possible to suppress the package 12 accommodated in the first space S1 and the second space S2 of the accommodating portion 3 from being stolen while the robot 2 unloads the desired package 12 form the accommodating portion 3.

When the desired package 12 is placed on the mounting portion 23 of the robot 2, the control unit 26 of the robot 2 controls the drive mechanism 22a of the telescopic portion 22 in order to lower the mounting portion 23. In contrast, the determination unit 442 of the opening-closing control device 44 determines whether the mounting portion 23 of the robot 2 has started descending, based on the progress status of the task by the robot 2 indicated by the information received from the control unit 26 of the robot 2 (S6).

When the mounting portion 23 of the robot 2 starts descending (YES in S6), the control unit 443 of the opening-closing control device 44 closes the third door 32c of the accommodating portion 3 as shown in FIG. 14. The third drive unit 42c and the third lock unit 43c are controlled in order to regulate the state of the door (S7). As a result, all the doors 32a, 32b, 32c of the accommodating portion 3 are restricted to the closed state.

When the lowering of the mounting portion 23 is completed, the control unit 26 of the robot 2 controls the drive mechanism 21d of the moving portion 21 to carry the package 12 as shown in FIG. 15 (S8). After that, when the control unit 63 of the task control device 6 recognizes that the transportation of the package 12 is completed based on the progress status of the task by the robot 2 indicated by the information received from the control unit 26 of the robot 2, the task system 1 ends the task using the task system 1.

In contrast, when the mounting portion 23 of the robot 2 has not started descending (NO in S6), the control unit 443 of the opening-closing control device 44 returns to step S6.

Here, when the package 12 is loaded into the accommodating portion 3 by using the robot 2, it can be realized in a flow substantially equal to the above-mentioned process. For example, in S1, the robot 2 may carry the package 12 instead of the step of moving the robot 2 in the state where the package 12 is not placed, and in S5, the package 12 may be carried in instead of the step of unloading the package 12 and step S8 may be omitted.

As described above, the opening-closing control device 44, the opening-closing control system 4, the task system 1, and the opening-closing control method of the present embodiment acquire information indicating that the door to be opened in order to execute the task, and restrict the doors other than the door indicated by the information in a closed state.

In this way, since the doors other than the door to be opened are maintained in the restricted state in which the doors are closed, while the robot 2 loads or unloads the package 12 between the spaces in which the desired package 12 is accommodated in the accommodating portion 3, it is possible to suppress the package 12 accommodated in another space in the accommodating portion 3 from being stolen.

Moreover, in the opening-closing control device 44, the opening-closing control system 4, the task system 1, and the opening-closing control method of the present embodiment, the door to be opened in order to execute the task can be automatically opened, and it is possible to realize making of the first door 32a, the second door 32b, and the third door 32c of the accommodating portion 3 automatic doors.

Figure 16:
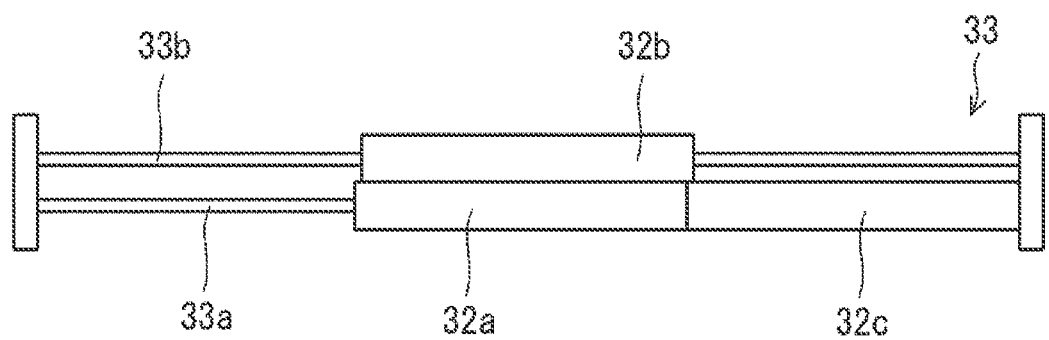
FIG. 16 is a diagram showing a state in which a first door of the accommodating portion is opened.
Figure 17:
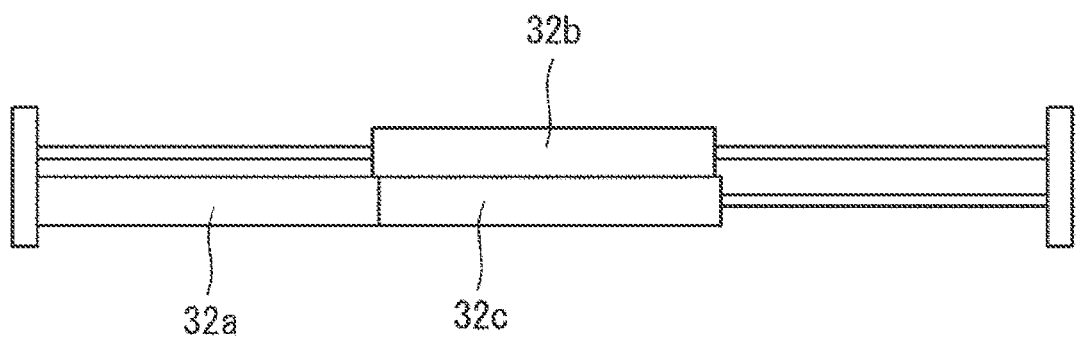
FIG. 17 is a diagram showing a state in which the third door of the accommodating portion is opened.
Figure 18:
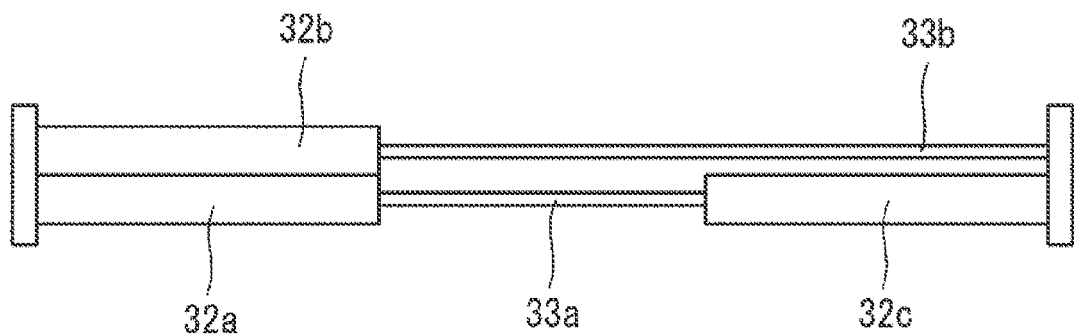
FIG. 18 is a diagram showing a state in which a second door of the accommodating portion is opened.

Here, the effect of arranging the first door 32a, the second door 32b, and the third door 32c of the accommodating portion 3 will be described. FIG. 16 is a diagram showing a state in which the first door of the accommodating portion is opened. FIG. 17 is a diagram showing a state in which the third door of the accommodating portion is opened. FIG. 18 is a diagram showing a state in which the second door of the accommodating portion is opened.

When loading or unloading the package 12 to and from the accommodating portion 3 by using the robot 2, it is sufficient to open any of the first door 32a, the second door 32b, and the third door 32c of the accommodating portion 3. Therefore, in the present embodiment, as shown in FIG. 6, the first rail 33a slidably suspends and supports the first door 32a and the third door 32c, and the second rail 33b slidably suspends and supports the second door 32b.

At this time, the first rail 33a has a length obtained by adding the width dimension of another door 32 to the total length of the width dimension of the first door 32a and the width dimension of the third door 32c. That is, the first rail 33a has the total length of the width dimension of the three doors 32, and the width dimension area of one door 32 is used to slide the first door 32a or the third door 32c, as shown in FIG. 16 and FIG. 17.

Further, the second rail 33b has a length obtained by adding the total width dimension of the two doors 32 to the width dimension of the second door 32b. That is, the second rail 33b also has the total length of the width dimensions of the three doors 32, and the second door 32b can be slid using the width dimension region of the two doors 32, as shown in FIG. 18.

As described above, in the present embodiment, the three doors 32 can be opened and closed by using the first rail 33a and the second rail 33b. Thus, the number of rails can be reduced and the accommodating portion 3 can be downsized as compared with the case where rails are provided for each door as in a general sliding door. In this way, when the accommodating portion 3 is arranged in the facility, the occupied space of the accommodating portion 3 can be reduced.

However, the number of doors slidably supported by one rail and the number of rails are not limited to the above, and in short, it is only necessary that each rail has a length in which at least the width dimension of one door is added to the total width dimension of the number of doors supported by the rail and that a plurality of doors are slidably supported on at least one rail. Further, the disclosure is not limited to the case in which the upper side of the door is supported by the rail, and the lower side of the door may be supported.

Figure 19:
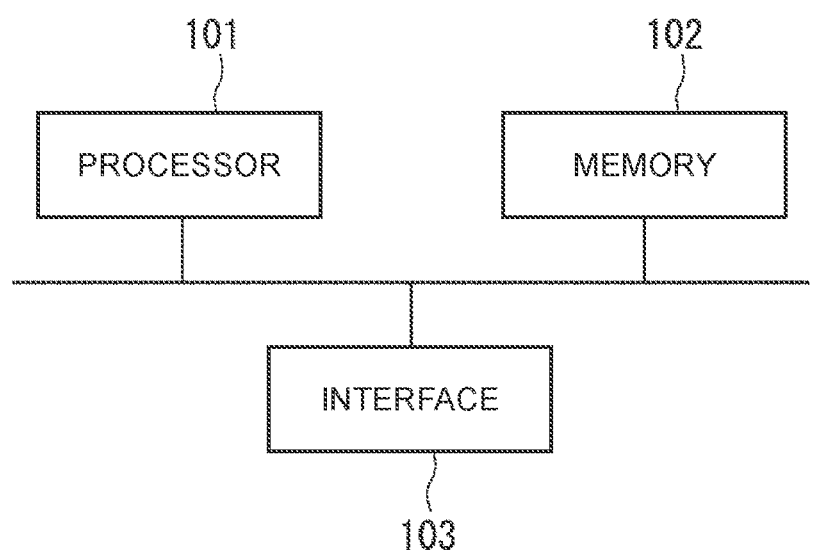
FIG. 19 is a diagram showing an example of a hardware configuration included in an opening-closing control device, an opening-closing control system, and a task system.

The opening-closing control device, the opening-closing control system, and the task system according to the above embodiment may have the following hardware configuration. FIG. 19 is a diagram showing an example the opening-closing control device, the opening-closing control system, and the task system. As the procedure of processing in the opening-closing control device, the opening-closing control system, and the task system has been described in various embodiments described above, the present disclosure may also take the form of a control method.

The control device shown in FIG. 19 includes a processor 101 and a memory 102 together with an interface 103. A part of the opening-closing control system and the task system and the configuration of the opening-closing control device described in the above-described embodiment are realized in a manner such that the processor 101 reads and executes a control program stored in the memory 102. That is, the program is a program for causing the processor 101 to function as a part of the opening-closing control system and the task system, and as the configuration of the opening-closing control device. It can be said that the program is a program for causing the opening-closing control system, the task system, and the opening-closing control device to execute the process in the configuration or a part thereof.

The program described above is stored using various types of non-transitory computer-readable media and can be supplied to a computer (a computer including an information notification device). The non-transitory computer-readable media include various types of tangible storage media. Examples of non-transitory computer-readable media include magnetic recording media (e.g., flexible disks, magnetic tapes, hard disk drives), magneto-optical recording media (e.g., magneto-optical disks). Further, the examples above include a compact disc read-only memory (CD-ROM), a compact disc recordable (CD-R), and a compact disc rewritable (CD-R/W). Further, the examples above include semiconductor memories (e.g., mask ROM, programmable ROM (PROM), erasable programmable ROM (EPROM), flash ROM, random access memory (RAM)). The program may also be supplied to the computer by various types of transitory computer-readable media. Examples of transitory computer-readable media include electrical and optical signals and electromagnetic waves. The transitory computer-readable media can supply a program to a computer via a wired communication path such as an electric wire and an optical fiber, or a wireless communication path.

The present disclosure is not limited to the above embodiment, and can be appropriately modified without departing from the spirit.

In the above embodiment, the position of the robot 2 is detected by using the detection unit 41. However, for example, the position of the robot 2 in the facility estimated by the robot 2 itself may be acquired and the detection unit 41 may be omitted.

In the above embodiment, the progress status of the task is acquired from the robot 2. However, the progress status of the task may be acquired based on the detection information of the detection unit 41. That is, for example, the position of the robot 2 and the height of the mounting portion 23 may be acquired by performing image processing on the detection information of the detection unit 41.

The door opening information acquisition unit 441 of the above embodiment acquires information indicating the door to be opened in order to execute the task based on the position of the robot 2. However, information indicating the door to be opened in order to execute the task may be acquired based on the task information.

In the above embodiment, the robot 2 loads or unloads the package 12 to and from the accommodating portion. However, the object that is loaded and unloaded is not limited to the package 12 as long as it can be stored in the storage unit. Further, the configuration of the accommodating portion 3 is not limited to the above, and it is sufficient that the accommodating portion 3 can accommodate an object and the door can be opened and closed. Therefore, the door is not limited to the sliding door as described above, and may be configured to rotate around a rotation axis. Further, the configuration of the robot 2 is not limited to the above, and may be any configuration as long as the robot 2 can load or unload an object from the accommodating portion, and may be, for example, a humanoid robot.

What is claimed is:

1. An opening-closing control device that is a device for controlling opening and closing of a plurality of doors of an accommodating portion when a robot executes a task of loading or unloading an object to and from the accommodating portion, the opening-closing control device comprising:
    a door opening information acquisition unit that acquires information indicating a door to be opened in order to execute the task;
    a determination unit that determines whether a mounting portion of the robot has reached a height at which the object is arranged, and whether the mounting portion of the robot has started descending; and
    a control unit that controls, based on the information indicating the door to be opened in order to execute the task, a lock unit that is arranged corresponding to each of the plurality of doors and that is configured to restrict a door other than the door to be opened in order to execute the task in a closed state;
wherein the control unit further opens the door to be opened when the determination unit determines that the mounting portion of the robot has reached the height at which the object is arranged, and closes the door when the determination unit determined that the mounting portion of the robot has started descending.

2. The opening-closing control device according to claim 1, wherein based on position information of the robot, the door opening information acquisition unit acquires the information indicating the door to be opened in order to execute the task by setting a door in front of which the robot is arranged, among the plurality of doors, as the door to be opened in order to execute the task.

3. The opening-closing control device according to claim 1, wherein the door opening information acquisition unit acquires the information indicating the door to be opened in order to execute the task, among the plurality of doors, based on task information for loading or unloading the object.

4. An opening-closing control device according to claim 1, wherein based on the information indicating the door to be opened in order to execute the task, the control unit controls a drive unit and the lock unit that are arranged corresponding to each of the doors and that are configured to open the door to be opened in order to execute the task.

5. An opening-closing control system comprising:
the opening-closing control device according to claim 1;
a plurality of drive units that opens and closes each of the doors; and
a plurality of lock units that restricts each of the doors in a closed state.

6. The opening-closing control system according to claim 5, comprising a detection unit that detects a position of the robot.

7. A task system comprising:
the opening-closing control system according to claim 5;
a robot that operates based on task information for loading or unloading the object to and from the accommodating portion; and
a task control device that controls the robot and the opening-closing control system.

8. The task system according to claim 7, comprising a task command unit that inputs from outside, task information for loading or unloading the object.

9. The task system according to claim 7, comprising an accommodating portion that has a plurality of first doors that is moveable along a first rail, and a second door that is moveable along a second rail, wherein:

the first rail has a length acquired by adding a width dimension of at least one first door to a total width dimension of the first doors; and
the second rail has a length acquired by adding a width dimension of at least one second door to a total width dimension of the second door.

10. An opening-closing control method that is a method that controls opening and closing of a plurality of doors of an accommodating portion when a robot executes a task of loading or unloading an object to and from the accommodating portion, the opening-closing control method comprising:
a step of acquiring information indicating a door to be opened in order to execute the task;
a step of controlling, based on the information indicating the door to be opened in order to execute the task, a lock unit that is arranged corresponding to each of the plurality of doors and that is configured to restrict a door other than the door to be opened in order to execute the task in a closed state;
a step of opening the door to be opened after a determination unit determines that a mounting portion of the robot has reached a height at which the object is arranged; and
a step of closing the door after the determination unit determines that the mounting portion of the robot has started descending.

11. A non-transitory computer-readable medium storing an opening-closing control program that controls opening and closing of a plurality of doors of an accommodating portion when a robot executes a task of loading or unloading an object to and from the accommodating portion, the opening-closing control program causing a computer to execute:
a process of acquiring information indicating a door to be opened in order to execute the task;
a process of controlling, based on the information indicating the door to be opened in order to execute the task, a lock unit that is arranged corresponding to each of the plurality of doors and that is configured to restrict a door other than the door to be opened in order to execute the task in a closed state;
a process of opening the door to be opened after a determination unit determines that a mounting portion of the robot has reached a height at which the object is arranged; and
a process of closing the door after the determination unit determines that the mounting portion of the robot has started descending.

* * * * *